United States Patent
Xu et al.

(10) Patent No.: US 8,989,069 B2
(45) Date of Patent: Mar. 24, 2015

(54) METHOD AND APPARATUS FOR CHANNEL QUALITY INDICATOR (CQI) ENHANCEMENTS

(75) Inventors: Hao Xu, San Diego, CA (US); Wanshi Chen, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 13/038,246

(22) Filed: Mar. 1, 2011

(65) Prior Publication Data

US 2011/0216682 A1 Sep. 8, 2011

Related U.S. Application Data

(60) Provisional application No. 61/310,127, filed on Mar. 3, 2010.

(51) Int. Cl.
  *G08C 17/00* (2006.01)
  *H04W 4/00* (2009.01)
  *H04B 7/00* (2006.01)
  *H04L 1/00* (2006.01)
  *H04W 76/04* (2009.01)
  *H04W 52/02* (2009.01)

(52) U.S. Cl.
  CPC ........... *H04L 1/0027* (2013.01); *H04W 76/048* (2013.01); *H04W 52/0219* (2013.01); *H04L 1/0028* (2013.01); *H04L 1/0078* (2013.01)
  USPC ............................. 370/311; 370/328; 455/522

(58) Field of Classification Search
  None
  See application file for complete search history.

(56) References Cited

U.S. PATENT DOCUMENTS

| | | | | |
|---|---|---|---|---|
| 6,002,673 A | * | 12/1999 | Kahn et al. | 370/252 |
| 8,149,809 B2 | * | 4/2012 | Kazmi et al. | 370/341 |
| 2007/0287468 A1 | * | 12/2007 | Jeong et al. | 455/452.2 |
| 2007/0287486 A1 | | 12/2007 | Machimura et al. | |
| 2009/0201861 A1 | * | 8/2009 | Kotecha | 370/329 |
| 2010/0027446 A1 | * | 2/2010 | Choi et al. | 370/280 |
| 2010/0035621 A1 | * | 2/2010 | Chun et al. | 455/450 |

FOREIGN PATENT DOCUMENTS

| | | |
|---|---|---|
| CN | 101427493 A | 5/2009 |
| EP | 2028906 A1 | 2/2009 |
| EP | 2259466 A2 | 12/2010 |
| JP | 2009533995 A | 9/2009 |
| JP | 2010525716 A | 7/2010 |
| JP | 2010537459 A | 12/2010 |
| JP | 2011517883 A | 6/2011 |
| JP | 2011530837 A | 12/2011 |
| WO | 2007123346 A1 | 11/2007 |
| WO | 2008132650 A2 | 11/2008 |

(Continued)

OTHER PUBLICATIONS

3GPP TS 36.213 version 9.0.1 Release 9, LTE Evolved Universal Terrestrial Radio Access (E-UTRA); Physical layer procedures, Jan. 2010, pp. 34-50.*

(Continued)

*Primary Examiner* — Faruk Hamza
*Assistant Examiner* — Cassandra Decker
(74) *Attorney, Agent, or Firm* — Ashish L. Patel

(57) ABSTRACT

Certain aspects of the present disclosure relate to techniques for reporting of channel quality indication in Long Term Evolution Advanced (LTE-A) wireless systems.

81 Claims, 6 Drawing Sheets

(56) References Cited

FOREIGN PATENT DOCUMENTS

| WO | 2009021572 | A1 | 2/2009 |
| WO | 2009114800 | A2 | 9/2009 |
| WO | 2009147053 | A2 | 12/2009 |
| WO | 2010018854 | A1 | 2/2010 |

OTHER PUBLICATIONS

International Search Report and Written Opinion—PCT/US2011/027069—ISA/EPO—Apr. 29, 2011.
Texas Instruments, "CQI Coding in PUCCH and PUSCH", 3GPP TSG RAN WG1#53 R1-081990, May 14, 2008, 3 pages.

* cited by examiner

METHOD AND APPARATUS FOR CHANNEL QUALITY INDICATOR (CQI) ENHANCEMENTS

CLAIM OF PRIORITY UNDER 35 U.S.C. §119

The present Application for Patent claims benefit of U.S. Provisional Patent Application Ser. No. 61/310,127, entitled, "Apparatus and method for channel quality indicator (CQI) enhancements for LTE-A", filed Mar. 3, 2010, and assigned to the assignee hereof and hereby expressly incorporated by reference herein.

BACKGROUND

1. Field

Certain aspects of the present disclosure generally relate to wireless communications and, more particularly, to methods and apparatus for enhancing indication of channel quality in Long Term Evolution Advanced (LTE-A) wireless systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The 3GPP LTE represents a major advance in cellular technology and it is a next step forward in cellular $3^{rd}$ generation (3G) services as a natural evolution of Global System for Mobile Communications (GSM) and Universal Mobile Telecommunications System (UMTS). The LTE provides for an uplink speed of up to 75 megabits per second (Mbps) and a downlink speed of up to 300 Mbps, and brings many technical benefits to cellular networks. The LTE is designed to meet carrier needs for high-speed data and media transport as well as high-capacity voice support. The bandwidth may be scalable from 1.25 MHz to 20 MHz. This suits the requirements of different network operators that have different bandwidth allocations, and also allows operators to provide different services based on spectrum. The LTE is also expected to improve spectral efficiency in 3G networks, allowing carriers to provide more data and voice services over a given bandwidth.

The LTE-A is a proposed next generation wireless technology evolution to the UMTS protocol family. Desired goals for LTE-A systems include enhanced data rates, for example, up to 1 Gbps on the downlink. In addition, deployment of LTE-A wireless systems may need to be backward-compatible with LTE systems to preserve the financial investments made in the preceding LTE infrastructure. Furthermore, another goal for LTE-A systems is improved spectral efficiency, that is, a higher data throughput per unit bandwidth, expressed in bits per second per Hertz (bps/Hz). Improved spectral efficiency is vital to the growth of the wireless communication industry since the available spectral resources for wireless transmission are severely limited and tightly regulated worldwide.

Physical layer (PHY) of LTE-A represents a highly efficient means of conveying both data and control information between an enhanced base station (eNodeB) and mobile user equipment (UE). The LTE-A PHY employs advanced technologies that are new to cellular applications. These include Orthogonal Frequency Division Multiplexing (OFDM) and Multiple Input Multiple Output (MIMO) data transmission. In addition, the LTE-A PHY uses OFDMA on the downlink and Single Carrier-Frequency Division Multiple Access (SC-FDMA) on the uplink. OFDMA allows data to be directed to or from multiple users on a subcarrier-by-subcarrier basis for a specified number of symbol periods.

SUMMARY

Certain aspects of the present disclosure provide a method for wireless communications. The method generally includes determining a plurality of periodicities for reporting one or more Channel Quality Indicators (CQIs) from an apparatus, and transmitting, to the apparatus, information about the plurality of periodicities.

Certain aspects of the present disclosure provide an apparatus for wireless communications. The apparatus generally includes means for determining a plurality of periodicities for reporting one or more Channel Quality Indicators (CQIs) from another apparatus, and means for transmitting, to the other apparatus, information about the plurality of periodicities.

Certain aspects of the present disclosure provide an apparatus for wireless communications. The apparatus generally includes a circuit configured to determine a plurality of periodicities for reporting one or more Channel Quality Indicators (CQIs) from another apparatus, and a transmitter configured to transmit, to the other apparatus, information about the plurality of periodicities.

Certain aspects of the present disclosure provide a computer program product. The computer program product generally includes a computer-readable medium comprising code for determining a plurality of periodicities for reporting one or more Channel Quality Indicators (CQIs) from an apparatus, and transmitting, to the apparatus, information about the plurality of periodicities.

Certain aspects of the present disclosure provide a method for wireless communications. The method generally includes obtaining, at an apparatus, information about a plurality of periodicities for reporting one or more Channel Quality Indicators (CQIs), determining to use a first periodicity of the plurality of periodicities, if the apparatus is in a Discontinuous Reception (DRX) mode, and determining to use a second periodicity of the plurality of periodicities, if the apparatus is not in the DRX mode.

Certain aspects of the present disclosure provide an apparatus for wireless communications. The apparatus generally includes means for obtaining information about a plurality of periodicities for reporting one or more Channel Quality Indicators (CQIs), means for determining to use a first periodicity of the plurality of periodicities, if the apparatus is in a Discontinuous Reception (DRX) mode, and means for determining to use a second periodicity of the plurality of periodicities, if the apparatus is not in the DRX mode.

Certain aspects of the present disclosure provide an apparatus for wireless communications. The apparatus generally includes a first circuit configured to obtain information about a plurality of periodicities for reporting one or more Channel Quality Indicators (CQIs), a second circuit configured to determine to use a first periodicity of the plurality of periodicities, if the apparatus is in a Discontinuous Reception (DRX) mode, wherein the second circuit is also configured to determine to use a second periodicity of the plurality of periodicities, if the apparatus is not in the DRX mode.

Certain aspects of the present disclosure provide a computer program product. The computer program product generally includes a computer-readable medium comprising code for obtaining, at an apparatus, information about a plurality of periodicities for reporting one or more Channel Quality Indicators (CQIs), determining to use a first periodicity of the plurality of periodicities, if the apparatus is in a Discontinuous Reception (DRX) mode, and determining to use a second periodicity of the plurality of periodicities, if the apparatus is not in the DRX mode.

Certain aspects of the present disclosure provide a method for wireless communications. The method generally includes generating a signal requesting at least one Channel Quality Indicator (CQI) from one or more apparatuses of a set of apparatuses, wherein each of the one or more apparatuses is in a Discontinuous Reception (DRX) mode, and transmitting the signal to the set of apparatuses.

Certain aspects of the present disclosure provide an apparatus for wireless communications. The apparatus generally includes means for generating a signal requesting at least one Channel Quality Indicator (CQI) from one or more apparatuses of a set of apparatuses, wherein each of the one or more apparatuses is in a Discontinuous Reception (DRX) mode, and means for transmitting the signal to the set of apparatuses.

Certain aspects of the present disclosure provide an apparatus for wireless communications. The apparatus generally includes a first circuit configured to generate a signal requesting at least one Channel Quality Indicator (CQI) from one or more apparatuses of a set of apparatuses, wherein each of the one or more apparatuses is in a Discontinuous Reception (DRX) mode, and a transmitter configured to transmit the signal to the set of apparatuses.

Certain aspects of the present disclosure provide a computer program product. The computer program product generally includes a computer-readable medium comprising code for generating a signal requesting at least one Channel Quality Indicator (CQI) from one or more apparatuses of a set of apparatuses, wherein each of the one or more apparatuses is in a Discontinuous Reception (DRX) mode, and transmitting the signal to the set of apparatuses.

Certain aspects of the present disclosure provide a method for wireless communications. The method generally includes receiving, at an apparatus, a signal requesting at least one Channel Quality Indicator (CQI) of a set of CQIs, wherein the at least one CQI is associated with the apparatus in a Discontinuous Reception (DRX) mode, detecting whether the signal is dedicated to the apparatus, and transmitting the at least one CQI, if the signal is dedicated to the apparatus.

Certain aspects of the present disclosure provide an apparatus for wireless communications. The apparatus generally includes means for receiving a signal requesting at least one Channel Quality Indicator (CQI) of a set of CQIs, wherein the at least one CQI is associated with the apparatus in a Discontinuous Reception (DRX) mode, means for detecting whether the signal is dedicated to the apparatus, and means for transmitting the at least one CQI, if the signal is dedicated to the apparatus.

Certain aspects of the present disclosure provide an apparatus for wireless communications. The apparatus generally includes a receiver configured to receive a signal requesting at least one Channel Quality Indicator (CQI) of a set of CQIs, wherein the at least one CQI is associated with the apparatus in a Discontinuous Reception (DRX) mode, a first circuit configured to detect whether the signal is dedicated to the apparatus, and a transmitter configured to transmit the at least one CQI, if the signal is dedicated to the apparatus.

Certain aspects of the present disclosure provide a computer program product. The computer program product generally includes a computer-readable medium comprising code for receiving, at an apparatus, a signal requesting at least one Channel Quality Indicator (CQI) of a set of CQIs, wherein the at least one CQI is associated with the apparatus in a Discontinuous Reception (DRX) mode, detecting whether the signal is dedicated to the apparatus, and transmitting the at least one CQI, if the signal is dedicated to the apparatus.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
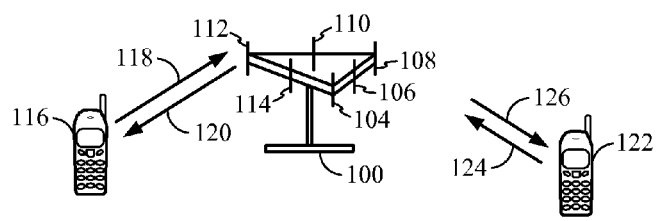
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) and Long Term Evolution Advanced (LTE-A) are upcoming releases of UMTS that use E-UTRA. UTRA, E-UTRA, GSM, UMTS, LTE and LTE-A are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE and LTE-A, and LTE and LTE-A terminology is used in much of the description below.

Certain aspects of the present disclosure are related to single carrier frequency division multiple access (SC-FDMA) transmission technique, which utilizes single carrier modulation at a transmitter and frequency domain equalization at a receiver. The SC-FDMA has similar performance and essentially the same overall complexity as the OFDMA. Main advantage of the SC-FDMA is that the SC-FDMA signal provides a lower peak-to-average power ratio (PAPR) than the OFDMA signal because of its inherent single carrier structure. The SC-FDMA technique has drawn great attention, especially in the uplink communications where lower PAPR greatly benefits a mobile terminal in terms of transmit power efficiency. This technique is currently utilized as the uplink multiple access scheme in 3GPP LTE, 3GPP LTE-A, or Evolved UTRA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

In an aspect of the present disclosure, the access point 100 may convey to any of the access terminals 122 (e.g., over a Physical Downlink Control Channel (PDCCH)) information about at least one of reporting periodicity or mode configuration for Channel Quality Indicator (CQI) feedback associated with that access terminal 122. The CQI feedback from the access terminal may be requested, for example, to accurately report downlink channel quality in order to efficiently utilize adaptive Physical Downlink Shared Channel (PDSCH) transmissions, to provide updates for Physical Uplink Control Channel (PUCCH) power control, or to being used for tracking loops at the access point. The access terminal 122 may be configured to determine the CQI according to the information received from the access point 100, and then to report the CQI to the access point 100 (e.g., over PUCCH or Physical Uplink Shared Channel (PUSCH)) in accordance with the at least one of reporting periodicity or mode configuration.

Figure 2:
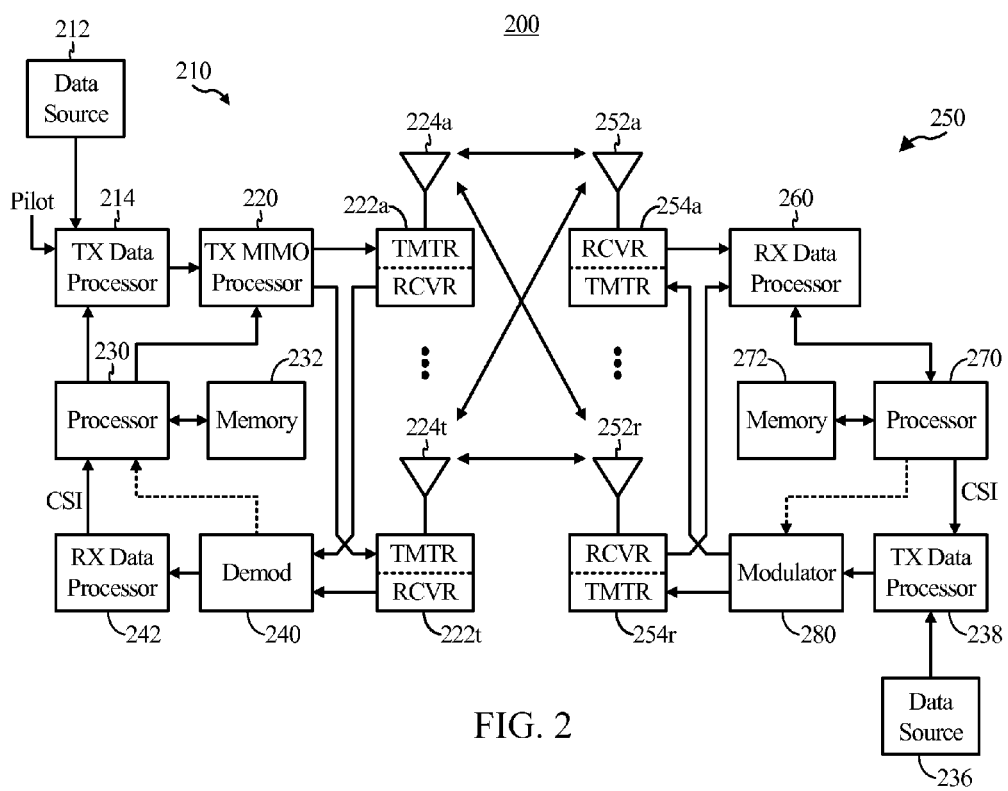
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using Orthogonal Frequency Division Multiplexing (OFDM) technique. The pilot data is typically a known data pattern that is processed in a known manner and may be used at the receiver system to estimate the channel response. The multiplexed pilot and coded data for each data stream may be then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams may be then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t may be then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filter, amplify, and down-convert) a respective received signal, digitize the conditioned signal to provide samples, and further process the samples to provide a corresponding "received" symbol stream.

An RX data processor 260 may then receive and process the $N_R$ received symbol streams from $N_R$ receivers 254 based on a particular receiver processing technique to provide $N_T$ "detected" symbol streams. The RX data processor 260 may then demodulate, de-interleave, and decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use. Processor 270 may formulate a reverse link message comprising a matrix index portion and a rank value portion. The reverse link message may comprise various types of information regarding the communication link and/or the received data stream. The reverse link message may be then processed by a TX data processor 238, which may also receive traffic data for a number of data streams from a data source 236, modulated by a modulator 280, conditioned by transmitters 254a through 254r, and transmitted back to transmitter system 210.

At transmitter system 210, the modulated signals from receiver system 250 may be received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights, and then it may process the extracted message.

In an aspect of the present disclosure, the access point 210 may convey to the access terminal 250 (e.g., over PDCCH) information about at least one of reporting periodicity or mode configuration for CQI feedback associated with the access terminal 250. For example, the processor 270 of the access terminal 250 may be configured to determine the CQI according to the information received from the access point 210. Then, the access terminal 250 may utilize the TX data processor 238 and the transmitter 252 to report the CQI to the access point (e.g., over PUCCH or PUSCH) in accordance with the at least one of reporting periodicity or mode configuration.

Figure 3:
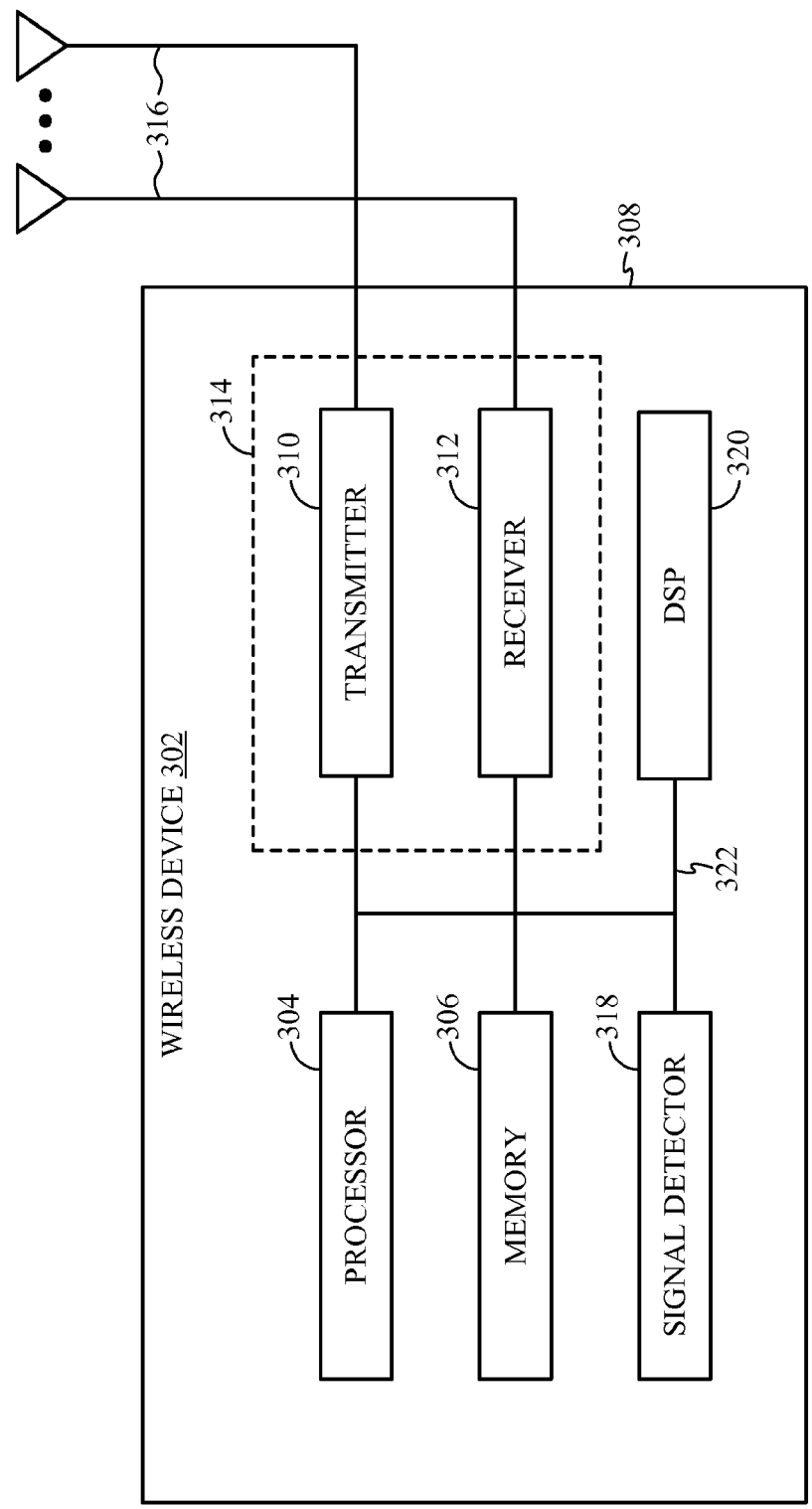
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In an aspect of the present disclosure, a base station (not shown in FIG. 3) may convey to the wireless device 302 (e.g., over PDCCH) information about at least one of reporting periodicity or mode configuration for CQI feedback associated with that wireless device 302. The processor 304 of the wireless device 302 may be configured to determine the CQI according to the information received from the serving base station, and then the wireless device 302 may utilize the processor 304 and the transmitter 310 to report the CQI to the serving base station (e.g., over PUCCH or PUSCH) in accordance with the at least one of reporting periodicity or mode configuration.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Long Term Evolution (LTE) and Long Term Evolution Advanced (LTE-A) represent evolutions of the Universal Mobile Telecommunications System (UMTS), a worldwide protocol family for wireless communications. The LTE and LTE-A provide several new technological features compared to previous wireless technologies including OFDM multicarrier transmission, provisions for multiple antennas for both transmit and receive, and an Internet protocol (IP) packet switching network infrastructure. In particular, OFDM relies on a two-dimensional array of orthogonal time and frequency resources that may be aggregated in many flexible ways to provide a wide variety of user services.

In LTE systems, a mobile station or mobile terminal that a user carries for wireless communications is known as user equipment (UE). In general, the UE may connect to other users either within the wireless network or the general communications infrastructure such as the public switched telephony network (PSTN), Internet, private networks, wide area networks (WANs), and so on via a wireless bidirectional link to an evolved NodeB (eNodeB), also known generically as a base station, which represents the wireless network access node for the UE. Other wireless network elements separate from the access nodes (e.g. eNodeBs) are considered part of the core network (CN). The eNodeB may be connected to other network elements such as the serving gateway (S-GW) and the Mobility Management Entity (MME). In an aspect, the S-GW may serve as a mobility anchor for data bearers when the UE moves between different eNodeBs. In another aspect, the MME may serve as a control entity for managing the signaling between the UE and the core network (CN). The S-GW may interface with the packet data network gateway (P-GW), which may function as a LTE portal to the global Internet, for example. The P-GW may also allocate IP addresses for the UE and enforces quality of service (QoS) based on policy rules.

In one aspect, the downlink resources in LTE may be partitioned into smaller elemental time and frequency resources. For example, in the time dimension, a radio frame may have 10 ms duration and may be divided into ten subframes, each of 1 ms duration. Furthermore, each subframe may be divided into two 0.5 ms slots. In the case of a normal cyclic prefix length, each slot may comprise seven OFDM symbols. In the frequency dimension, a Resource Block (RB) may be a group of 12 subcarriers each with a subcarrier bandwidth of 15 kHz. A subcarrier can be also denoted as a tone, for example. One Resource Element (RE) may be the smallest resource unit in LTE, which may comprise one subcarrier and one OFDM symbol.

In another aspect, certain Resource Blocks may be dedicated for special signals such as synchronization signals, reference signals, control signals and broadcast system information. For example, three essential synchronization steps in LTE may be necessary: symbol timing acquisition, carrier frequency synchronization, and sampling clock synchronization. In one example, LTE relies on two special synchronization signals for each cell: the Primary Synchronization Signal (PSS) and the Secondary Synchronization Signal (SSS) which may be used for time and frequency synchronization and for broadcasting of certain system parameters such as cell identification, cyclic prefix length, duplex method, and so on. In general, the PSS may be detected by the UE first, followed by SSS detection.

In an aspect, the PSS may be based on a Zadoff-Chu sequence, a constant amplitude chirp-like digital sequence. In general, the PSS may be detected non-coherently (i.e., detection without phase information) by the UE since no a priori channel information may be available at the UE. In another aspect, the SSS may be based on a maximal length sequence (also known as M-sequence). Since the detection of the SSS may be performed after the detection of the PSS, if channel state information (CSI) is available to the UE after PSS detection, then coherent detection (i.e., detection with phase information) of the SSS may be available. In certain scenarios, however, non-coherent detection of the SSS may be required, for example, in the case of coherent interference from neighboring eNodeBs.

In another aspect, after PSS and SSS detection has been accomplished, for the case of new cell identification, the UE may acquire and track certain Reference Signals (RS) from the LTE downlink. The LTE downlink, in one example, may comprise three unique RS types as follows: Cell-specific RSs broadcast to all UEs within a cell, UE-specific RSs intended only for certain UEs, and MBSFN-specific RSs intended only for Multimedia Broadcast Single Frequency Network (MBSFN) operation.

Figure 4:
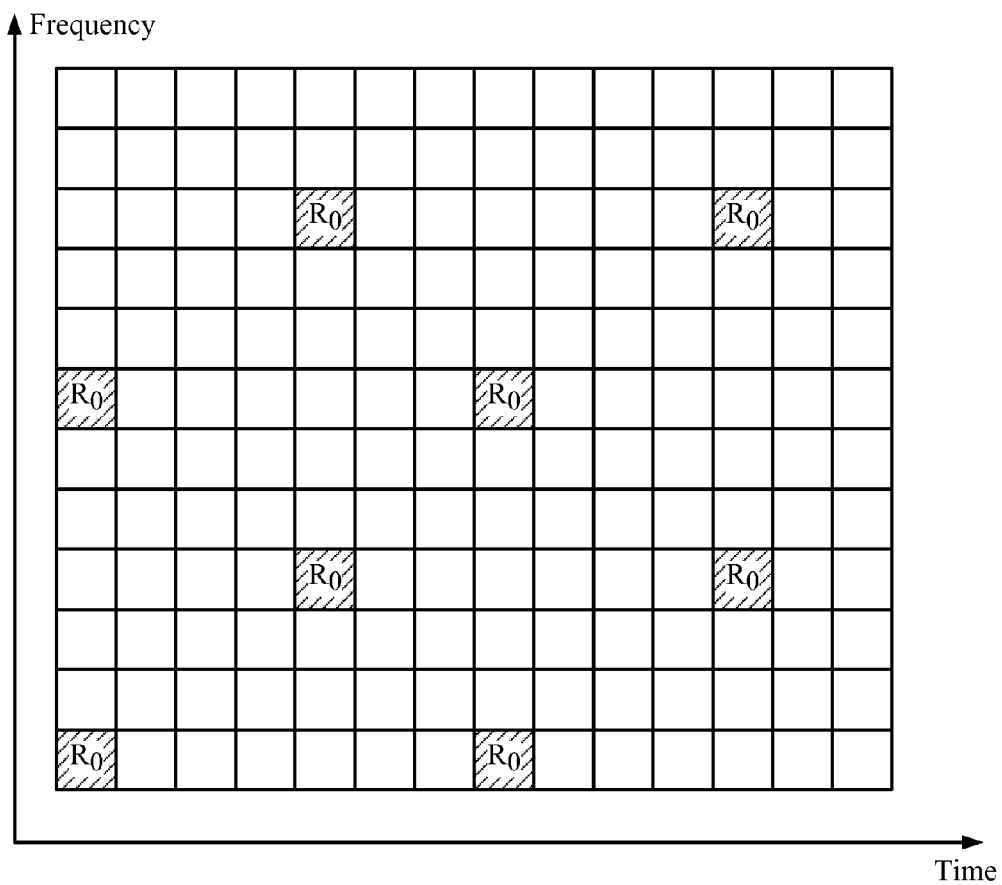
FIG. 4 illustrates an example cell-specific Reference Signal (RS) arrangement with a normal cyclic prefix (CP) length in accordance with certain aspects of the present disclosure.

In an aspect, the LTE downlink may provide RSs within certain locations within an OFDM time-frequency lattice. For example, FIG. 4 illustrates an example cell-specific RS arrangement with a normal cyclic prefix (CP) length. As illustrated, the RS symbols may be staggered in the time dimension and frequency dimension according to the expected channel coherence bandwidth and maximum Doppler spread, respectively.

In another aspect, each RS may utilize quaternary phase shift keyed (QPSK) modulation using a length-31 Gold sequence for good cross-correlation properties. The cell-specific RS may also comprise a cell identification field and a cell-specific frequency shift to mitigate interference from adjacent cells.

For LTE or LTE-A wireless systems, user equipment (UE) may be required to read a system information block (SIB) before starting a Random Access CHannel (RACH) procedure for connected-mode or for camping to a cell in idle mode. In UMTS Release-8 (Rel-8), a UE may need to detect the PSS/SSS signal to determine the physical layer cell identifier, and then may read the Physical Broadcast Channel (PBCH) for system bandwidth information, Physical Hybrid automatic repeat request Indicator Channel (PHICH) duration information, and system frame number (SFN) information. Next, the UE may attempt to decode control information for SIB1 that may be carried in the Physical Downlink Shared Channel (PDSCH). The control information may comprise both the Physical Control Format Indicator Channel (PCFICH) and the Physical Downlink Control Channel (PDCCH).

For LTE systems, two modes may be supported for transmitting Channel Quality Indicator (CQI) from UE to eNodeB: periodic CQI and aperiodic CQI. From field measurements, it can be observed that the typical user applications for smart phones may require very short bursty transmission. For such applications, a Discontinuous Reception (DRX) can be designed to multiplex large number of users. In addition, it may be desired to change CQI periodicity for the DRX such that more users can be simultaneously supported. According to certain aspects, higher layer signaling may be required to make such changes.

Certain aspects of the present disclosure support methods to allow more efficient CQI multiplexing for DRX operations in LTE-A systems. This may include automatic switching of CQI reporting mode and periodicity, as well as means for dynamically turning on CQI based on a group PDCCH assignment.

Reporting of Channel Quality Indicator (CQI)

The LTE (UMTS Rel-8) provides Channel Quality Indicator (CQI) feedback from UE to an eNodeB in order to adapt the downlink modulation and code rate to the prevailing channel conditions. In an aspect, the periodicity of CQI reporting may be governed by the eNodeB. In an aspect, two CQI modes may be configured by an upper protocol layer: a periodic CQI mode and an aperiodic CQI mode. For the periodic CQI mode, the CQI reports may be transmitted by the UE on Physical Uplink Control Channel (PUCCH) in formats 2/2a/2b or on PUSCH if there is a scheduled PUSCH transmission. In one example, the periodicity for wideband periodic CQI reporting may range from 2 ms to 160 ms. For the aperiodic CQI mode, the CQI reports may be transmitted by the UE on Physical Uplink Shared Channel (PUSCH) with or without data. For example, aperiodic CQI reports may be scheduled by an eNodeB via a CQI request bit transmitted on PDCCH.

In one aspect, when UE is in the connected mode, CQI may be scheduled frequently for one or more of the following reasons: (1) to accurately report downlink quality in order to efficiently use adaptive PDSCH transmissions, (2) to provide updates for PUCCH power control, or (3) to be used for other eNodeB tracking loops, for example, a frequency tracking loop (FTL). In one example, it can be observed from field data that many applications have short bursty traffic. Because of that, it may be more efficient to transition users into a DRX mode. In this case, UE may wake up to transmit a short burst of data, and then go back to the DRX mode.

For overhead reduction, when the UE transitions to the DRX mode, it may be desirable to reduce the CQI reporting cycle to free up resources. In current systems, this periodicity change may require higher layer signaling. Often times, this signaling may be costly compared to the short bursty data. The current LTE standard does allow one bit to turn off CQI reporting completely, but this action may eliminate any CQI reporting.

From a physical (PHY) layer and medium access control (MAC) layer perspective, it may be desirable to have one or more of the following features for CQI reporting with considerations of DRX operations: (1) different CQI configurations for on and off periods of DRX; (2) an option of such configuration change without higher layer signaling for overhead reduction; (3) reduced CQI requirements during DRX time to allow more user multiplexing; and (4) an option to turn off the CQI channels dynamically, especially immediately before going into connected mode in order to reduce the loss due to inaccurate CQI reporting because of reduced cycles. In one example, the dynamic CQI may be turned on by an eNodeB upon downlink traffic arrival. The present disclosure proposes different options to address the above issues.

Methods and Apparatus for Enhancement of CQI Reporting

In an aspect of the present disclosure, for LTE-A systems, automatic periodicity change for CQI reporting may be utilized. Automatic switching into a different CQI periodicity may be enabled without higher layer signaling. For example, each UE may be given two CQI periodicity settings during call setup, and the switching may be automatically triggered by DRX mode. The UE may have more frequent CQI periodicity for connected mode, and less frequent CQI periodicity for DRX mode. When the UE enters DRX mode, it may automatically reduce the CQI reporting cycle. In addition, when the UE transitions from DRX mode, it may automatically use the more frequent CQI periodicity.

In another aspect of the present disclosure, a dynamic aperiodic CQI reporting may be utilized. A CQI report may be enabled upon data arrival during a DRX off period in order to prepare UE for data transmissions. Whenever the UE goes into DRX mode, it may optionally transition into a dynamic aperiodic CQI mode, where by default no CQI is transmitted. With this new mode, the UE may transmit CQI only dynamically.

Multiple users may be assigned the same CQI resources to extend multiplexing capability. The actual CQI transmission may be turned on dynamically through PDCCH group assignments. One option may be to assign a group of users with a group Radio Network Temporary Identifier (G-RNTI), which may be used to scramble the PDCCH. A bit map may be provided within a PDCCH Downlink Control Information (DCI) format that may turn each user on or off. The UE may monitor PDCCH with its G-RNTI during the on time in DRX mode. If the PDCCH passes a Cyclic Redundancy Check (CRC) with its G-RNTI, then the UE may check the bit map for its CQI bit. If the CQI bit is on, then the UE may transmit a CQI report on the next allowed CQI instance.

In yet another aspect of the present disclosure, a dynamic periodic CQI reporting may be utilized. The CQI reporting may be enabled dynamically when it is needed such as for transition between on and off periods during DRX mode. An eNodeB may utilize a PDCCH frame to assign and de-assign CQI transmission, which is the same principle as persistent assignment for data transmission, for example for Voice over IP (VoIP). In this case, UEs may be provided with persistent configurations for CQI.

The eNodeB may use the PDCCH frame to assign and de-assign CQI transmission. Once assigned through the PDCCH, UE may continue CQI transmission with the provided configuration until it is de-assigned. This may be useful when there is data arrival at the eNodeB during the DRX off time to prepare the UE for downlink data transmissions. Since this approach for CQI reporting is fully controlled by the eNodeB, it may provide more flexibility in terms of user multiplexing.

In yet another aspect of the present disclosure, a dynamic CQI mode switching may be utilized. Different modes may be supported for CQI transmission. For example, a mode 1-0 may be supported for single antenna port or open-loop PDSCH transmission. For the mode 1-0, CQI may comprise a payload of four bits. On the other hand, a mode 1-1 may be supported for closed-loop spatial multiplexing PDSCH. For the case of four transmit antennas and a large rank, the CQI of mode 1-1 may comprise a payload of eleven bits. Other modes may comprise 2-0, 2-1 modes for UE that selected to perform sub-band reporting. All the aforementioned CQI reporting modes may provide necessary CQI/PMFRI (Channel Quality Indicator/Precoding Matrix Indicator/Rank Indicator) information for PDSCH transmission. However, some of the modes may require higher transmit power at UE in order to maintain the same CQI decoding accuracy, such as the mode 1-1 may require a higher transmit power that the mode 1-0 because of longer payloads.

In addition to periodicity change, it may be also possible to automatically switch CQI reporting mode during DRX. Upon transitioning into a DRX state, the UE may automatically transition to the mode 1-0 in order to reduce the transmit power and interference to other users or cells. Upon transitioning into data transmission state, the UE may either directly transition to the previous CQI mode before DRX, or it may slowly transition into the previous CQI state after being some pre-defined time with the mode 1-0 CQI reporting.

In yet another aspect of the present disclosure, joint switching of CQI reporting mode and periodicity may be utilized. In general, both CQI reporting periodicity and reporting mode changes may be allowed for one or more of the following modes: (1) CQI configuration change triggered by DRX; (2) CQI configuration change triggered by PDCCH group assignment; or (3) CQI configuration change triggered by persistent assignment and de-assignment.

Figure 5:
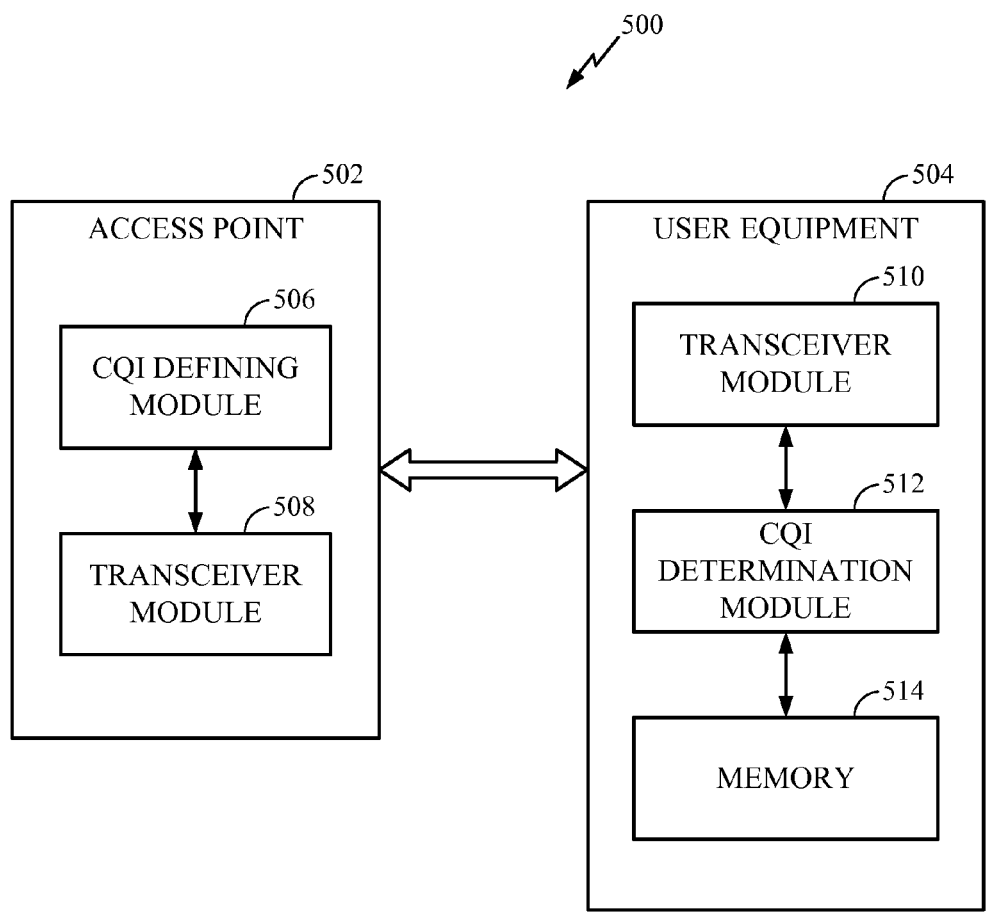
FIG. 5 illustrates an example system that facilitates enhancing of channel quality indication (CQI) reporting in accordance with certain aspects of the present disclosure.

FIG. 5 illustrates an example system 500 that facilitates enhancing of CQI reporting in accordance with certain aspects of the present disclosure. The system 500 may comprise an access point 502 (e.g., base station, Node B, eNodeB, and so on) that may communicate with an access terminal 504 (e.g., UE, mobile station, mobile device, and/or any number of disparate devices (not shown)). The eNodeB 502 may transmit information to the UE 504 over a forward link channel or downlink channel; further the eNodeB 502 may receive information from the UE 504 over a reverse link channel or uplink channel. Moreover, the system 500 may be a MIMO system. Additionally, the system 500 may operate in an OFDMA wireless network (such as 3GPP LTE network or LTE-A network). Also, in an aspect, the components and functionalities shown and described below in the eNodeB 502 may be present in the UE 504 and vice versa.

The eNodeB 502 may comprise a CQI defining module 506 that may be configured to define (e.g., for the serving UE 504) at least one of CQI reporting periodicity (e.g., more frequent CQI periodicity for the connected mode of UE, less frequent CQI periodicity for the DRX mode of UE, and so on) or CQI mode configuration (e.g., dynamic aperiodic CQI reporting, dynamic periodic CQI reporting, mode 1-0, mode 1-1, and so on), in accordance with aspects of the present disclosure. The eNodeB 502 may further comprise a transceiver module 508 that may be configured to convey to the UE 504 (e.g., within a PDCCH frame) information about the at least one of CQI reporting periodicity or CQI mode configuration, in accordance with certain aspects of the present disclosure.

The UE 504 may comprise a transceiver module 510 that may be configured to receive the information about the at least one of CQI reporting periodicity or CQI mode configuration transmitted from the eNodeB 502. The UE 504 may further comprise a CQI determination module 512 that may be configured to determine CQI for reporting to the eNodeB 502 according to the information received from the eNodeB. The UE 504 may further comprise a memory 514 for storing information related to all possible CQI reporting periodicities and CQI mode configurations associated with the UE 504. The UE may report, according to the at least one of CQI reporting periodicity or CQI mode configuration, the CQI to the eNodeB by using the transceiver module 510.

Figure 6:
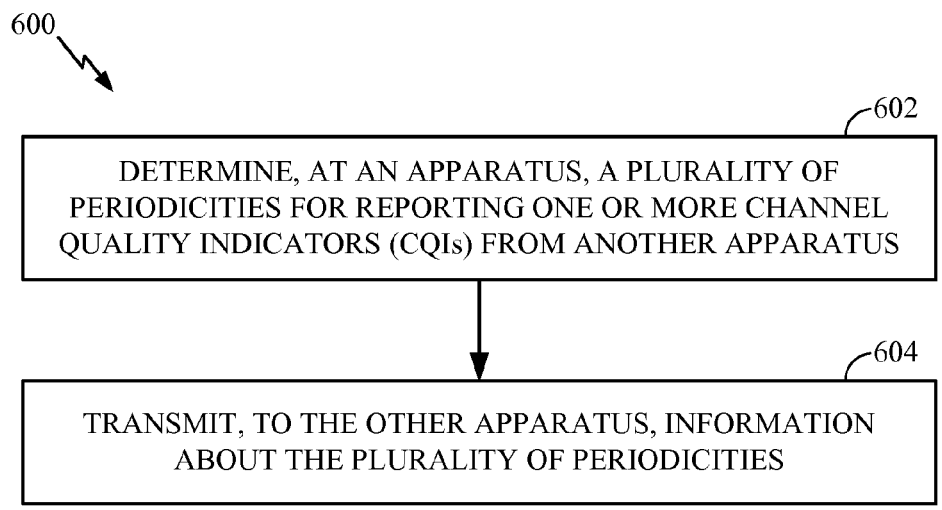
FIG. 6 illustrates example operations that may be performed at an access point in accordance with certain aspects of the present disclosure.

FIG. 6 is a functional block diagram conceptually illustrating example blocks 600 that may be performed at an eNodeB in accordance with certain aspects of the present disclosure. Operations illustrated by the blocks 600 may be executed, for example, at the processor 230 of the access point 210 from FIG. 2, at the processor 304 of the wireless device 302 from FIG. 3, and/or at the modules 506, 508 of the eNodeB 502 from FIG. 5.

The operations may begin, at block 602, by determining a plurality of periodicities for reporting one or more CQIs from UE (e.g., the UE 504 from FIG. 5). At block 604, the eNodeB may transmit, to the UE, information about the plurality of periodicities.

In one configuration, the apparatus 210 for wireless communication includes means for determining a plurality of periodicities for reporting one or more CQIs from another apparatus (e.g., the apparatus 250), and means for transmitting, to the other apparatus, information about the plurality of periodicities. In one aspect, the aforementioned means may be the processor 230 configured to perform the functions recited by the aforementioned means. In another aspect, the aforementioned means may be a module or any apparatus (e.g., the apparatus 502 with modules 506, 508 illustrated in FIG. 5) configured to perform the functions recited by the aforementioned means.

Figure 7:
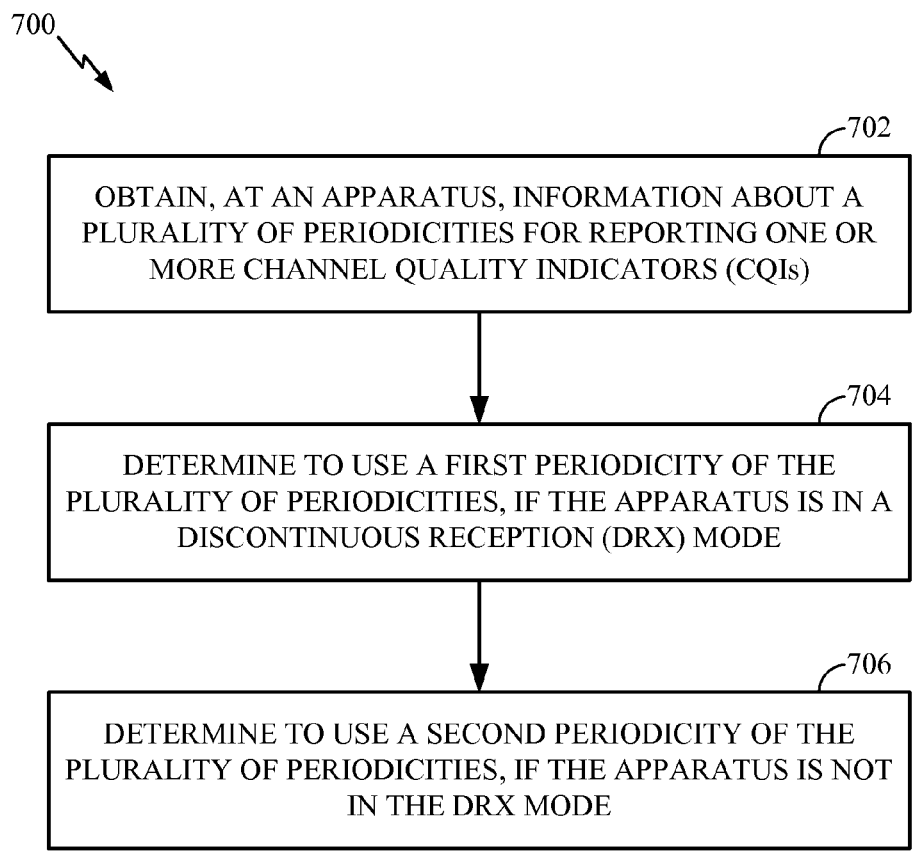
FIG. 7 illustrates example operations that may be performed at a user terminal in accordance with certain aspects of the present disclosure.

FIG. 7 is a functional block diagram conceptually illustrating example blocks 700 that may be performed at a user equipment in accordance with certain aspects of the present disclosure. Operations illustrated by the blocks 700 may be executed, for example, at the processor 270 of the access terminal 250 from FIG. 2, at the processor 304 of the wireless device 302 from FIG. 3, and/or at the modules 510, 512, 514 of the UE 504 from FIG. 5.

The operations may begin, at block 702, by obtaining information about a plurality of periodicities for reporting one or more CQIs. At block 704, the UE may determine to use a first periodicity of the plurality of periodicities, if the UE is in a DRX mode. At block 706, the UE may determine to use a second periodicity of the plurality of periodicities, if the UE is not in the DRX mode.

In an aspect, the UE may determine to stop transmission of the at least one CQI of a mode 1-0 according to the first periodicity and to start periodical transmission of CQIs of another mode (e.g., a mode 1-1) according to the second periodicity, upon the UE transitions from the DRX mode into a connected mode. In an aspect, the other mode was used before the UE transitioned into the DRX mode. In an aspect, the UE may transmit at least one of the CQIs with a payload of a first size, if the UE is in a DRX mode. On the other hand, the UE may transmit at least one of the CQIs with a payload of a second size, if the UE is not in the DRX mode, wherein the first size may be smaller than the second size.

In one configuration, the apparatus 250 for wireless communication includes means for obtaining information about a plurality of periodicities for reporting one or more CQIs, means for determining to use a first periodicity of the plurality of periodicities, if the apparatus 250 is in a DRX mode, and means for determining to use a second periodicity of the plurality of periodicities, if the apparatus 250 is not in the DRX mode. In one aspect, the aforementioned means may be the processor 270 configured to perform the functions recited by the aforementioned means. In another aspect, the aforementioned means may be a module or any apparatus (e.g., the apparatus 504 with modules 510, 512, 514 illustrated in FIG. 5) configured to perform the functions recited by the aforementioned means.

Figure 8:
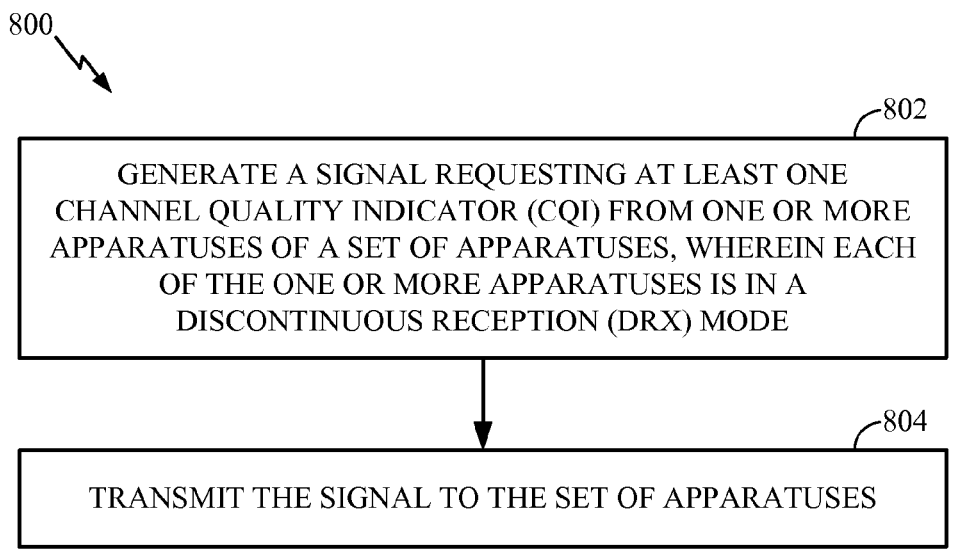
FIG. 8 illustrates other example operations that may be performed at an access point in accordance with certain aspects of the present disclosure.

FIG. 8 is a functional block diagram conceptually illustrating example blocks 800 that may be performed at an eNodeB in accordance with certain aspects of the present disclosure. Operations illustrated by the blocks 800 may be executed, for example, at the processor 230 of the access point 210 from FIG. 2, at the processor 304 of the wireless device 302 from FIG. 3, and/or at the modules 506, 508 of the eNodeB 502 from FIG. 5.

The operations may begin, at block 802, by generating a signal requesting at least one CQI from one or more UEs of a set of UEs, wherein each of the one or more UEs may be in a DRX mode. At block 804, the eNodeB may transmit the signal to the set of UEs.

In an aspect, the signal comprises a Physical Downlink Control Channel (PDCCH) frame with an indication about a Group Radio Network Temporary Identifier (G-RNTI) assigned to a group of UEs from the set, wherein the one or more UEs may belong to the group. The PDCCH frame may comprise one or more indications to activate reporting of the at least one CQI from the UEs. Further, the eNodeB may transmit another signal to de-assign the periodical transmission, wherein the other signal may comprise another PDCCH frame. In another aspect, the signal may comprises a PDCCH frame that assigns periodical transmission of the at least one CQI. Also, the signal may comprise at least one of an indication about a mode of the at least one CQI, or another indication about a periodicity for transmitting the at least one CQI.

In one configuration, the apparatus 210 for wireless communication includes means for generating a signal requesting at least one CQI from one or more apparatuses of a set of apparatuses, wherein each of the one or more apparatuses may be in a DRX mode, and means for transmitting the signal to the set of apparatuses. In one aspect, the aforementioned means may be the processor 230 configured to perform the functions recited by the aforementioned means. In another aspect, the aforementioned means may be a module or any apparatus (e.g., the apparatus 502 with modules 506, 508 illustrated in FIG. 5) configured to perform the functions recited by the aforementioned means.

Figure 9:
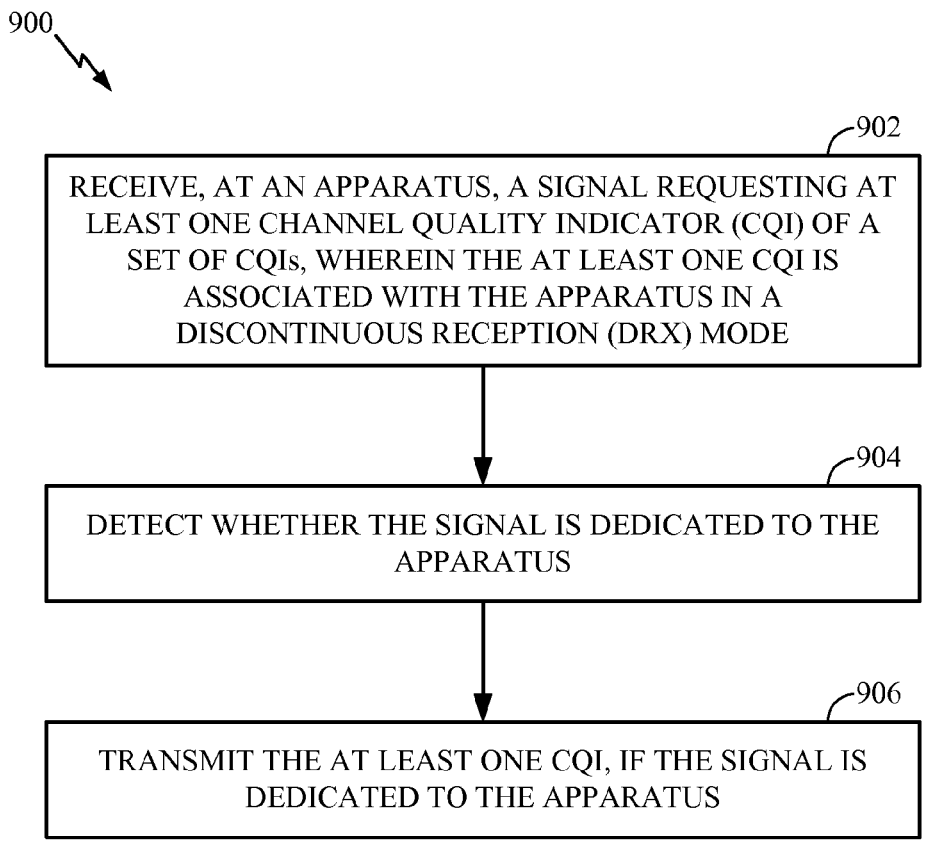
FIG. 9 illustrates other example operations that may be performed at a user terminal in accordance with certain aspects of the present disclosure.

FIG. 9 is a functional block diagram conceptually illustrating example blocks 900 that may be performed at a user equipment in accordance with certain aspects of the present disclosure. Operations illustrated by the blocks 900 may be executed, for example, at the processor 270 of the access terminal 250 from FIG. 2, at the processor 304 of the wireless device 302 from FIG. 3, and/or at the modules 510, 512, 514 of the UE 504 from FIG. 5.

The operations may begin, at block 902, by receiving a signal requesting at least one CQI of a set of CQIs, wherein the at least one CQI may be associated with the UE in a DRX mode. At block 904, the UE may detect whether the signal is dedicated to the UE. At block 906, the UE may transmit the at least one CQI, if the signal is dedicated to the UE.

In an aspect, the signal may comprise a PDCCH frame with an indication about a G-RNTI assigned to a group of UEs. The UE may be configured to calculate a cyclic redundancy check (CRC) sum based on the PDCCH frame and the indication about G-RNTI, and check, in the PDCCH frame, another indication for transmitting the at least one CQI, if the CRC sum indicates that the UE belongs to the group. In an aspect, the UE may transmit the at least one CQI on a next allowed CQI instance according to the other indication. In another aspect, the signal may comprise a PDCCH frame assigning periodical transmission of the at least one CQI. The UE may be then configured to periodically transmit the at least one CQI based on the PDCCH frame. In an aspect, the UE may be configured to receive another signal for de-assigning the periodical transmission, and the UE may cease the periodical transmission based on the other signal.

In one configuration, the apparatus 250 for wireless communication includes means for receiving a signal requesting at least one CQI of a set of CQIs, wherein the at least one CQI may be associated with the apparatus 250 in a DRX mode, means for detecting whether the signal is dedicated to the apparatus 250, and means for transmitting the at least one CQI, if the signal is dedicated to the apparatus 250. In one aspect, the aforementioned means may be the processor 270 configured to perform the functions recited by the aforementioned means. In another aspect, the aforementioned means may be a module or any apparatus (e.g., the apparatus 504 with modules 510, 512, 514 illustrated in FIG. 5) configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
   determining a plurality of periodicities for reporting one or more Channel Quality Indicators (CQIs) from an apparatus; and
   transmitting, to the apparatus, information about the plurality of periodicities,
   wherein a first periodicity of the plurality of periodicities is for reporting the one or more CQIs according to a first CQI reporting mode comprising a payload of a first size, upon the apparatus transitioning to a Discontinuous Reception (DRX) mode, and
   wherein a second periodicity of the plurality of periodicities is for reporting the one or more CQIs according to a second CQI reporting mode comprising a payload of a second size different from the first size, upon the apparatus transitioning out of the DRX mode.

2. The method of claim 1, wherein the plurality of periodicities only comprises the first periodicity and the second periodicity.

3. The method of claim 2, wherein:
   the second periodicity is associated with the apparatus being in a connected mode, and
   the second periodicity is more frequent than the first periodicity.

4. The method of claim 1, wherein the information is transmitted during a call setup of the apparatus.

5. The method of claim 1, wherein the first CQI reporting mode comprises a mode 1-0 and the first payload size comprises a payload of four bits.

6. The method of claim 1, wherein the second CQI reporting mode comprises a mode 1-1 and the second payload size comprises a payload of eleven bits.

7. The method of claim 1, wherein:
   first size is smaller than the second size.

8. An apparatus for wireless communications, comprising:
   means for determining a plurality of periodicities for reporting one or more Channel Quality Indicators (CQIs) from another apparatus; and
   means for transmitting, to the another apparatus, information about the plurality of periodicities,
   wherein a first periodicity of the plurality of periodicities is for reporting the one or more CQIs according to a first CQI reporting mode comprising a payload of a first size, upon the another apparatus transitioning to a Discontinuous Reception (DRX) mode, and
   wherein a second periodicity of the plurality of periodicities is for reporting the one or more CQIs according to a second CQI reporting mode comprising a payload of a second size different from the first size, upon the another apparatus transitioning out of the DRX mode.

9. The apparatus of claim 8, wherein the plurality of periodicities only comprises the first periodicity and the second periodicity.

10. The apparatus of claim 9, wherein:
    the second periodicity is associated with the another apparatus being in a connected mode, and
    the second periodicity is more frequent than the first periodicity.

11. The apparatus of claim 8, wherein the information is transmitted during a call setup of the another apparatus.

12. The apparatus of claim 8, wherein the first CQI reporting mode comprises a mode 1-0 and the first payload size comprises a payload of four bits.

13. The apparatus of claim 8, wherein the second CQI reporting mode comprises a mode 1-1 and the second payload size comprises a payload of eleven bits.

14. The apparatus of claim 8, wherein:
    the first size is smaller than the second size.

15. An apparatus for wireless communications, comprising:
    a circuit configured to determine a plurality of periodicities for reporting one or more Channel Quality Indicators (CQIs) from another apparatus; and
    a transmitter configured to transmit, to the another apparatus, information about the plurality of periodicities,
    wherein a first periodicity of the plurality of periodicities is for reporting the one or more CQIs according to a first CQI reporting mode comprising a payload of a first size, upon the another apparatus transitioning to a Discontinuous Reception (DRX) mode, and
    wherein a second periodicity of the plurality of periodicities is for reporting the one or more CQIs according to a second CQI reporting mode comprising a payload of a second size different from the first size, upon the another apparatus transitioning out of the DRX mode.

16. A computer program product, comprising a non-transitory computer-readable medium comprising code for:
    determining a plurality of periodicities for reporting one or more Channel Quality Indicators (CQIs) from an apparatus; and
    transmitting, to the apparatus, information about the plurality of periodicities,
    wherein a first periodicity of the plurality of periodicities is for reporting the one or more CQIs according to a first CQI reporting mode comprising a payload of a first size, upon the apparatus transitioning to a Discontinuous Reception (DRX) mode, and
    wherein a second periodicity of the plurality of periodicities is for reporting the one or more CQIs according to a second CQI reporting mode comprising a payload of a second size different from the first size, upon the apparatus transitioning out of the DRX mode.

17. A method for wireless communications, comprising:
    obtaining, at an apparatus, information about a plurality of periodicities for reporting one or more Channel Quality Indicators (CQIs);
    determining to report the one or more CQIs according to a first CQI reporting mode comprising a payload of a first size at a first periodicity of the plurality of periodicities, upon the apparatus transitioning to a Discontinuous Reception (DRX) mode; and
    determining to report the one or more CQIs according to a second CQI reporting mode comprising a payload of a second size different from the first size at a second periodicity of the plurality of periodicities, upon the apparatus transitioning out of the DRX mode.

18. The method of claim 17, wherein the first periodicity is less frequent than the second periodicity.

19. The method of claim 17, wherein the information is obtained during a call setup of the apparatus.

20. The method of claim 17, wherein the first CQI reporting mode comprises a mode 1-0 and the first payload size comprises a payload of four bits.

21. The method of claim 20, wherein
    the second CQI reporting mode was used before the apparatus transitioned into the DRX mode.

22. The method of claim 21, wherein the second CQI reporting mode comprises a mode 1-1 and the second payload size comprises a payload of eleven bits requiring a higher transmit power of the apparatus than the mode 1-0.

23. The method of claim 17,
wherein the first size is smaller than the second size.

24. An apparatus for wireless communications, comprising:
means for obtaining information about a plurality of periodicities for reporting one or more Channel Quality Indicators (CQIs);
means for determining to report the one or more CQIs according to a first CQI reporting mode comprising a payload of a first size at a first periodicity of the plurality of periodicities, upon the apparatus transitioning to a Discontinuous Reception (DRX) mode; and
means for determining to report the one or more CQIs according to a second CQI reporting mode comprising a payload of a second size different from the first size at a second periodicity of the plurality of periodicities, upon the apparatus transitioning out of the DRX mode.

25. The apparatus of claim 24, wherein the first periodicity is less frequent than the second periodicity.

26. The apparatus of claim 24, wherein the information is obtained during a call setup of the apparatus.

27. The apparatus of claim 24, wherein the first CQI reporting mode comprises a mode 1-0 and the first payload size comprises a payload of four bits.

28. The apparatus of claim 27, wherein
the second CQI reporting mode was used before the apparatus transitioned into the DRX mode.

29. The apparatus of claim 28, wherein the second CQI reporting mode comprises a mode 1-1 and the second payload size comprises a payload of eleven bits requiring a higher transmit power of the apparatus than the mode 1-0.

30. The apparatus of claim 24,
wherein the first size is smaller than the second size.

31. An apparatus for wireless communications, comprising:
a first circuit configured to obtain information about a plurality of periodicities for reporting one or more Channel Quality Indicators (CQIs);
a second circuit configured to determine to report the one or more CQIs according to a first CQI reporting mode comprising a payload of a first size at a first periodicity of the plurality of periodicities, upon the apparatus transitioning to a Discontinuous Reception (DRX) mode, wherein
the second circuit is also configured to determine to report the one or more CQIs according to a second CQI reporting mode comprising a payload of a second size different from the first size at a second periodicity of the plurality of periodicities, upon the apparatus transitioning out of the DRX mode.

32. A computer program product, comprising a non-transitory computer-readable medium comprising code for:
obtaining, at an apparatus, information about a plurality of periodicities for reporting one or more Channel Quality Indicators (CQIs);
determining to report the one or more CQIs according to a first CQI reporting mode comprising a payload of a first size at a first periodicity of the plurality of periodicities, upon the apparatus transitioning to a Discontinuous Reception (DRX) mode; and
determining to report the one or more CQIs according to a second CQI reporting mode comprising a payload of a second size different from the first size at a second periodicity of the plurality of periodicities, upon the apparatus transitioning out of the DRX mode.

33. A method for wireless communications, comprising:
generating a signal requesting at least one Channel Quality Indicator (CQI) from one or more apparatuses of a set of apparatuses, wherein each of the one or more apparatuses is in is configured to transition between a Discontinuous Reception (DRX) mode and a non-DRX mode; and
transmitting the signal to the set of apparatuses,
wherein the signal comprises CQI mode configuration, the CQI mode configuration including a first CQI reporting mode comprising a payload of a first size to be used by each of the one or more apparatuses for transmission of the at least one CQI, upon that apparatus transitioning from the non-DRX mode to the DRX mode, and
wherein the CQI mode configuration includes a second CQI reporting mode comprising a payload of a second size different from the first size to be used by each of the one or more apparatuses for transmission of the at least one CQI, upon that apparatus transitioning from the DRX mode to the non-DRX mode.

34. The method of claim 33, wherein:
the signal comprises a Physical Downlink Control Channel (PDCCH) frame with an indication about a Group Radio Network Temporary Identifier (G-RNTI) assigned to a group of apparatuses from the set of apparatuses, and
the one or more apparatuses belong to the group of apparatuses.

35. The method of claim 34, wherein the PDCCH frame comprises one or more indications to activate reporting of the at least one CQI from the one or more apparatuses.

36. The method of claim 35, wherein each of the one or more indications comprises a one-bit value.

37. The method of claim 33, further comprising:
assigning at least two of the one more apparatuses with same resources for transmitting CQIs from the at least two apparatuses.

38. The method of claim 33, wherein the signal comprises a Physical Downlink Control Channel (PDCCH) frame that assigns periodical transmission of the at least one CQI.

39. The method of claim 38, further comprising:
transmitting another signal to de-assign the periodical transmission, wherein the another signal comprises another PDCCH frame.

40. The method of claim 33, wherein the first CQI reporting mode comprises a mode 1-0 and the payload of the first size comprises a payload of four bits.

41. The method of claim 33, wherein the second CQI reporting mode comprises a mode 1-1 and the payload of the second size comprises a payload of eleven bits.

42. The method of claim 33, wherein:
the first size is smaller than the second size.

43. An apparatus for wireless communications, comprising:
means for generating a signal requesting at least one Channel Quality Indicator (CQI) from one or more apparatuses of a set of apparatuses, wherein each of the one or more apparatuses is in is configured to transition between a Discontinuous Reception (DRX) mode and a non-DRX mode; and
means for transmitting the signal to the set of apparatuses,
wherein the signal comprises CQI mode configuration, the CQI mode configuration including a first CQI reporting mode comprising a payload of a first size to be used by each of the one or more apparatuses for transmission of the at least one CQI, upon that apparatus transitioning from the non-DRX mode to the DRX mode, and wherein the CQI mode configuration includes a second CQI reporting mode comprising a payload of a second size different from the first size to be used by each of the one or more apparatuses for transmission of the at least one CQI, upon that apparatus transitioning from the DRX mode to the non-DRX mode.

44. The apparatus of claim 43, wherein:
the signal comprises a Physical Downlink Control Channel (PDCCH) frame with an indication about a Group Radio Network Temporary Identifier (G-RNTI) assigned to a group of apparatuses from the set of apparatuses, and
the one or more apparatuses belong to the group of apparatuses.

45. The apparatus of claim 44, wherein the PDCCH frame comprises one or more indications to activate reporting of the at least one CQI from the one or more apparatuses.

46. The apparatus of claim 45, wherein each of the one or more indications comprises a one-bit value.

47. The apparatus of claim 43, further comprising:
means for assigning at least two of the one more apparatuses with same resources for transmitting CQIs from the at least two apparatuses.

48. The apparatus of claim 43, wherein the signal comprises a Physical Downlink Control Channel (PDCCH) frame that assigns periodical transmission of the at least one CQI.

49. The apparatus of claim 48, wherein the means for transmitting is further configured to:
transmit another signal to de-assign the periodical transmission, wherein the another signal comprises another PDCCH frame.

50. The apparatus of claim 43, wherein the first CQI reporting mode comprises a mode 1-0 and the payload of the first size comprises a payload of four bits.

51. The apparatus of claim 43, wherein the second CQI reporting mode comprises a mode 1-1 and the payload of the second size comprises a payload of eleven bits.

52. The apparatus of claim 43, wherein:
the first size is smaller than the second size.

53. An apparatus for wireless communications, comprising:
a first circuit configured to generate a signal requesting at least one Channel Quality Indicator (CQI) from one or more apparatuses of a set of apparatuses, wherein each of the one or more apparatuses is configured to transition between a Discontinuous Reception (DRX) mode and a non-DRX mode; and
a transmitter configured to transmit the signal to the set of apparatuses,
wherein the signal comprises CQI mode configuration, the CQI mode configuration including a first CQI reporting mode comprising a payload of a first size to be used by each of the one or more apparatuses for transmission of the at least one CQI, upon that apparatus transitioning from the non-DRX mode to the DRX mode, and
wherein the CQI mode configuration includes a second CQI reporting mode comprising a payload of a second size different from the first size to be used by each of the one or more apparatuses for transmission of the at least one CQI, upon that apparatus transitioning from the DRX mode to the non-DRX mode.

54. A computer program product, comprising a non-transitory computer-readable medium comprising code for:
generating a signal requesting at least one Channel Quality Indicator (CQI) from one or more apparatuses of a set of apparatuses, wherein each of the one or more apparatuses is configured to transition between a Discontinuous Reception (DRX) mode and a non-DRX mode; and
transmitting the signal to the set of apparatuses,
wherein the signal comprises CQI mode configuration, the CQI mode configuration including a first CQI reporting mode comprising a payload of a first size to be used by each of the one or more apparatuses for transmission of the at least one CQI, upon that apparatus transitioning from the non-DRX mode to the DRX mode, and
wherein the CQI mode configuration includes a second CQI reporting mode comprising a payload of a second size different from the first size to be used by each of the one or more apparatuses for transmission of the at least one CQI, upon that apparatus transitioning from the DRX mode to the non-DRX mode.

55. A method for wireless communications, comprising:
receiving, at an apparatus, a signal requesting at least one Channel Quality Indicator (CQI) of a set of CQIs, wherein the apparatus is configured to transition between a Discontinuous Reception (DRX) mode and a non-DRX mode, the signal including CQI mode configuration;
detecting whether the signal is dedicated to the apparatus; and
transmitting the at least one CQI according to the CQI mode configuration, if the signal is dedicated to the apparatus, wherein the transmitting the at least one CQI comprises:
determining to transmit the at least one CQI according to a first CQI reporting mode with payloads of a first size, upon transitioning from the non-DRX mode to the DRX mode; and
determining to transmit the at least one CQI according to a second CQI reporting mode with payloads of a second size different from the first size, upon the apparatus transitioning from the DRX mode to the non-DRX mode.

56. The method of claim 55, wherein the signal comprises a Physical Downlink Control Channel (PDCCH) frame with an indication about a Group Radio Network Temporary Identifier (G-RNTI) assigned to a group of apparatuses, and the method further comprising
calculating a cyclic redundancy check (CRC) sum based on the PDCCH frame and the indication about G-RNTI; and
checking, in the PDCCH frame, another indication for transmitting the at least one CQI, if the CRC sum indicates that the apparatus belongs to the group of apparatuses.

57. The method of claim 56, further comprising:
transmitting the at least one CQI on a next allowed CQI instance according to the another indication.

58. The method of claim 56, wherein the another indication comprises a one-bit value.

59. The method of claim 55, further comprising:
transmitting the at least one CQI using same resources assigned for transmitting one or more other CQIs from one or more other apparatuses.

60. The method of claim 55, wherein:
the signal comprises a Physical Downlink Control Channel (PDCCH) frame assigning periodical transmission of the at least one CQI from the apparatus, and the method further comprising
transmitting periodically the at least one CQI based on the PDCCH frame.

61. The method of claim 60, further comprising:
receiving another signal for de-assigning the periodical transmission; and
ceasing the periodical transmission based on the another signal.

62. The method of claim 61, wherein the another signal comprises another PDCCH frame.

63. The method of claim 55, wherein the first CQI reporting mode comprises a mode 1-0 and the payloads of the first size comprise payloads of four bits.

64. The method of claim 63, wherein
the second CQI reporting mode is used before the apparatus transitions into the DRX mode.

65. The method of claim 64, wherein the second CQI reporting mode comprises a mode 1-1 and the payloads of the second size comprise payloads of eleven bits, requiring a higher transmit power of the apparatus than the mode 1-0.

66. The method of claim 55, wherein the first size is smaller than the second size.

67. An apparatus for wireless communications, comprising:
means for receiving a signal requesting at least one Channel Quality Indicator (CQI) of a set of CQIs, wherein the apparatus is configured to transition between a Discontinuous Reception (DRX) mode and a non-DRX mode, the signal including CQI mode configuration;
means for detecting whether the signal is dedicated to the apparatus; and
means for transmitting the at least one CQI according to the CQI mode configuration, if the signal is dedicated to the apparatus, wherein the means for transmitting the at least one CQI is configured to:
determine to transmit the at least one CQI according to a first CQI reporting mode with payloads of a first size, upon transitioning from the non-DRX mode to the DRX mode; and
determine to transmit the at least one CQI according to a second CQI reporting mode with payloads of a second size different from the first size, upon the apparatus transitioning from the DRX mode to the non-DRX mode.

68. The apparatus of claim 67, wherein the signal comprises a Physical Downlink Control Channel (PDCCH) frame with an indication about a Group Radio Network Temporary Identifier (G-RNTI) assigned to a group of apparatuses, and the apparatus further comprising
means for calculating a cyclic redundancy check (CRC) sum based on the PDCCH frame and the indication about G-RNTI; and
means for checking, in the PDCCH frame, another indication for transmitting the at least one CQI, if the CRC sum indicates that the apparatus belongs to the group of apparatuses.

69. The apparatus of claim 68, wherein the means for transmitting is further configured to:
transmit the at least one CQI on a next allowed CQI instance according to the another indication.

70. The apparatus of claim 68, wherein the another indication comprises a one-bit value.

71. The apparatus of claim 67, wherein the means for transmitting is further configured to:
transmit the at least one CQI using same resources assigned for transmitting one or more other CQIs from one or more other apparatuses.

72. The apparatus of claim 67, wherein:
the signal comprises a Physical Downlink Control Channel (PDCCH) frame assigning periodical transmission of the at least one CQI from the apparatus, and
the means for transmitting is further configured to transmit periodically the at least one CQI based on the PDCCH frame.

73. The apparatus of claim 72, wherein the means for receiving is further configured to:
receive another signal for de-assigning the periodical transmission, and the apparatus further comprising
means for ceasing the periodical transmission based on the another signal.

74. The apparatus of claim 73, wherein the another signal comprises another PDCCH frame.

75. The apparatus of claim 67, wherein the first CQI reporting mode comprises a mode 1-0 and the payloads of the first size comprise payloads of four bits.

76. The apparatus of claim 75, wherein
the second CQI reporting mode is used before the apparatus transitions into the DRX mode.

77. The apparatus of claim 76, wherein the second CQI reporting mode comprises a mode 1-1 and the payloads of the second size comprise payloads of eleven bits, requiring a higher transmit power of the apparatus than the mode 1-0.

78. The apparatus of claim 67, further comprising:
means for determining, based on the signal, at least one of a mode of the at least one CQI or a periodicity for transmitting the at least one CQI.

79. The apparatus of claim 67, wherein the first size is smaller than the second size.

80. An apparatus for wireless communications, comprising:
a receiver configured to receive a signal requesting at least one Channel Quality Indicator (CQI) of a set of CQIs, wherein the apparatus is configured to transition between a Discontinuous Reception (DRX) mode and a non-DRX mode;
a first circuit configured to detect whether the signal is dedicated to the apparatus; and
a transmitter configured to transmit the at least one CQI, if the signal is dedicated to the apparatus, wherein the transmitter is further configured to:
determine to transmit the at least one CQI according to a first CQI reporting mode with payloads of a first size, upon transitioning from the non-DRX mode to the DRX mode; and
determine to transmit the at least one CQI according to a second CQI reporting mode with payloads of a second size different from the first size, upon the apparatus transitioning from the DRX mode to the non-DRX mode.

81. A computer program product, comprising a non-transitory computer-readable medium comprising code for:
receiving, at an apparatus, a signal requesting at least one Channel Quality Indicator (CQI) of a set of CQIs, wherein the apparatus is configured to transition between a Discontinuous Reception (DRX) mode and a non-DRX mode;
detecting whether the signal is dedicated to the apparatus; and
transmitting the at least one CQI, if the signal is dedicated to the apparatus, wherein the transmitting the at least one CQI comprises:

determining to transmit the at least one CQI according to a first CQI reporting mode with payloads of a first size, upon transitioning from the non-DRX mode to the DRX mode; and determining to transmit the at least one CQI according to a second CQI reporting mode with payloads of a second size different from the first size, upon the apparatus transitioning from the DRX mode to the non-DRX mode.

\* \* \* \* \*